United States Patent [19]
Tatsumi

[11] Patent Number: 5,727,019
[45] Date of Patent: Mar. 10, 1998

[54] DIGITAL MODEM

[75] Inventor: Satoshi Tatsumi, Tokyo, Japan

[73] Assignee: NEC Corporation, Japan

[21] Appl. No.: 651,523

[22] Filed: May 22, 1996

[30] Foreign Application Priority Data

May 24, 1995 [JP] Japan ................... 7-124135

[51] Int. Cl.[6] .................................................. H04L 7/00
[52] U.S. Cl. ......................... 375/222; 455/76; 455/86; 375/376
[58] Field of Search ........................ 375/219, 222, 375/281, 283, 327–328, 331, 376; 329/307, 308; 331/14; 455/76, 84, 86, 260

[56] References Cited

U.S. PATENT DOCUMENTS

| | | | |
|---|---|---|---|
| 5,230,088 | 7/1993 | Kramer, Jr. et al. | 455/76 |
| 5,471,652 | 11/1995 | Hulkko | 455/76 |
| 5,497,126 | 3/1996 | Kosiec et al. | 331/1 A |
| 5,511,236 | 4/1996 | Umstattd et al. | 455/76 |
| 5,519,885 | 5/1996 | Vaisanen | 455/76 |
| 5,535,432 | 7/1996 | Dent | 455/77 |
| 5,574,985 | 11/1996 | Ylikotila | 455/76 |
| 5,603,099 | 2/1997 | Watanabe | 455/84 |
| 5,640,688 | 6/1997 | Ruitenburg | 455/84 |

FOREIGN PATENT DOCUMENTS

| 2296141 | 6/1996 | United Kingdom. |
|---|---|---|
| 9316530 | 8/1993 | WIPO. |

*Primary Examiner*—Young T. Tse
*Attorney, Agent, or Firm*—Ostrolenk, Faber, Gerb & Soffen, LLP

[57] ABSTRACT

A modem LSI includes a combination of a first frequency divider, a first PLL circuit composed of a phase comparator, an LPF and a VCO, and a first select switch for selecting one of the first frequency divider and the first PLL circuit to provide a detection clock for a detector and a combination of a second frequency divider, a second PLL circuit composed of a phase comparator, an LPF and a VCO, and a second select switch for selecting one of the second frequency divider and the second PLL circuit to provide an operation clock for a roll-off wave generator and a clock regenerator, the first and second frequency dividers and the first and second PLL circuits each receiving a reference clock from a common oscillator installed outside the LSI.

5 Claims, 4 Drawing Sheets

1

DIGITAL MODEM

BACKGROUND OF THE INVENTION

The present invention generally relates to a combination of modulator and demodulator (hereafter collectively "modem"), and particularly, to a digital modem for a digital radio communication apparatus such as a digital portable telephone, a digital automobile telephone or a digital cordless telephone.

1. Description of the Related Art

In Japan the digital portable telephone as well as the digital cordless telephone employs in a modulating section thereof a π/4-shift DQPSK (digital quadrature phase-shift keying) system including a roll-off wave generator as a roll-off filter for band-limiting a transmission data to generate a combination of an I channel signal and a Q channel signal, and in a demodulating section thereof a combintion of a delay detector of a digital type in a typical case and a clock regenerator.

The roll-off wave generator is typically implemented as a high-accuracy roll-off filter comprising a digital filter that needs a first clock of which a period is equivalent to a symbol period times an integer that typically exceeds about 100.

The delay detector is responsible for each period of information symbol to detect a phase variation of an intermediate-frequency (hereafter "IF") signal of a received radio-frequency (hereafter "RF") signal, and typically is implemented as a digital detector simple of circuit constitution that employs a second clock of which a frequency should be an IF frequency times an adequate integer to ensure a phase resolution of 5 bits or 32 tones or more.

Moreover, it is necessary for the delay detection to detect a phase varying point of the received IF signal, by synchronizing a detection timing clock of the clock regenerator to a symbol period of the received signal, as it is detected. For this purpose, there is effected a fine adjustment of a regenerated clock in the clock regenerator, by using a third clock of which a period is equivalent to the symbol period times an integer that typically exceeds about 100.

The first to third clocks should be accurate. In conventional digital modems, therefore, a temperature compensated quartz oscillator known as a reference oscillator for digital radio communication apparatus has been employed in a dedicated manner for supplying each such clock, or in combination with a phase-locked loop (hereafter "PLL") circuit to provide a clock synchoronized to an output of the quartz oscillator.

FIG. 1 is a block diagram of an essential part of a conventional digital portable telephone including a digital modem.

As shown in FIG. 1, the portable telephone comprises a common antenna 101, a transmission (hereafter "Tx")/reception (hereafter "Rx") select switch 102 connected to the antenna 101, an Rx block 103 connected to Rx terminal of the switch 102, a Tx block 104 connected to a Tx terminal of the switch 102, and a digital modem as an LSI 201 formed on a single chip.

The LSI 201 comprises: a delay detector 301 connected at a signal input termianl thereof to a signal output terminal of the Rx block 103 and at a data output terminal thereof to a data input terminal of an unshown Rx data processor; a roll-off wave generator 401 connected at a data input terminal thereof to a data output terminal of an unshown Tx data processor and at a pair of signal output terminals thereof to a pair of signal input terminals of the Tx block 104; and clock circuitry.

The clock circuitry includes: a reference clock supply line connected to an external temperature-compensated quartz oscillator 703 for supplying a reference clock 403 as a first clock to the roll-off wave generator 401; a phase comparator 507 as part of a PLL circuit 507-506-508 for supplying a detection clock 306 as a second clock to the delay detector 301, the PLL circuit being composed of an external loop filter (hereafter "LPF") 506 for filtering an output of the comparator 507, an external voltage-controlled oscillator (hereafter "VCO") 508 responsible for an output of the LPF 506 to output the detection clock 306, and the internal phase comparator 507 which compares a frequency and a phase of the detection clock 306 with those of a reference clock 701 supplied from another external temperature-compensated quartz oscillator 702; and a clock regenerator 302 that receives the reference clock 403, as it is branched thereto as a third clock, and frequency-divides the received clock 403 to provide the delay detector 301 with a variable detection timing clock 305 in response to a detection data 304 as a result of detection at the delay detector 301.

An RF signal received by the antenna 101 is input through the select switch 102, as it is controlled to an RX side, to the Rx block 103, where it is converted into an IF signal 105 which is input to the delay detector 301, which employs the detection clock 306 to execute a detection for demodulation of the IF signal 105 to provide a demodulated data 303 to be output to the Rx data processor.

The clock regenerator 302 receives a result of the detection as the detection data 304 and responds thereto to frequency-divide the reference clock 403 so that a symbol period of the IF signal 105 is reproduced to generate the detection timing clock 305 to be output to the delay detector 301.

The roll-off wave generator 401 is responsible for the reference clock 403 to execute a digital filtering of a Tx data 402 from the Tx data processor to provide a combination of an I channel signal 106 and a Q channel signal 107 which are input to the Tx block 104, where they are converted into an RF signal to be transmitted through the select switch 102, as it is controlled to a Tx side, and the antenna 101.

As a typical type in Japan, the digital portable telephone employs an IF carrier of 450 kHz. Therefore, the detection clock 306 should have a frequency of 14.4 MHz (=IF×32) or more. The reference clock 403 should be e.g. a 2.688 MHz corresponding to a multiplication by $2^7$ of a symbol period at a 21 kHz.

As the quartz oscillator 702 generating the reference clock 701 of the portable telephone is a typical spread type of 12.8 MHz or the like, it is difficult to generate necessary clocks such as of the frequency of 14.4 MHz or of the 2.688 MHz by dividing the typical frequency.

Therefore, the detection clock 306 is generated by using the PLL circuit 507-506-508; and the reference clock 403, by a dedicated provision of the quartz oscillator 703.

The detection clock 306 for the digital delay detector 301 needs to have a frequency equivalent to the IF times an adequate integer for a phase quantization. The clock 403 for operation of the roll-off wave generator 401 and the clock regenerator 302 also needs to have a frequency equivalent to a symbol frequency times an adequate integer.

The temperature-compensated quartz oscillator provides a reference clock with a frequency restricted by performance characteristics of the oscillator as well as from the production and cost, so that the frequency cannot be voluntarily selected, which constitutes the difficulty of obtaining necessary clocks for a digital modem by simply ferequency-dividing the reference clock 701.

Accordingly, the modem of the conventional digital portable telephone generates the detection clock 306 by employing a combination of the external VCO 508 and the external LPF 506 for eliminating noises of the PLL circuit 507-506-508, and the operation clock 403 by using the external temperature-compensated quartz oscillator 703, resulting in an enlarged application area and an increased cost.

In the circuit of FIG. 1, the clock 403 is employed as a common operation clock for the roll-off wave generator 401 and the clock regenerator 302.

However, some types of apparatus needs a pair of operation clocks different from each other in frequency.

In such the case, there is needed an external provision of a combination of a temperature-compensated quartz oscillator and an LPF of a PLL circuit for each operation clock.

Moreover, such the operation clock is required to have a frequency designed in consideration of an intended use and circumferential conditions of use. It is impractical for the conventional arrangement to cope with such the needs.

The present invention has been achieved with such points in mind.

SUMMARY OF THE INVENTION

It therefore is an object of the present invention to provide a digital modem adaptive for a circuit integration with a possibly reduced number of external components.

To achieve the object, a genus of the present invention provides a digital modulator-demodulator comprising a detector means operative in synchronism with a first operation clock for a digital detection of a received signal, a modulator means operative in synchronism with a second operation clock for modulating a digital transmission data, a first clock generating means for generating the first operation clock, and a second clock generating means for generating the second operation clock, wherein at least one of the first and second clock generating means comprises a frequency divider means for frequency-dividing a reference clock to provide a third clock, a phase synchronizing means for generating a fourth clock phase-synchronised with the reference clock, and a switch means for alternatively selecting one of the third and fourth clocks to provide a corresponding one of the first and second operation clocks.

According to the genus of the invention, an operation clock such as for a detection or modulation is permitted to have a voluntarily set frequency by a combination of a frequency divider means for frequency-dividing a reference clock to provide a desirable clock, a phase synchronizing means for generating another desirable clock phase-synchronised with the reference clock, and a switch means for alternatively selecting one of the desirable clocks, as necessary.

According to a species of the genus of the invention, each of the first and second clock generating means comprises the frequency divider means, the phase synchronizing means, and the switch means.

According to another species of the genus of the invention, the detector means comprises a detector operative for a delay detection of the received signal composed of a π/4-shift DQPSK signal, and a clock regenerator responsible for a result of the delay detection to detect a symbol period of the received signal, the first clock generating means comprises a third clock generating means for generating a detection clock for the detector means, and a fourth clock generating means for generating the first operation clock, and the third and fourth clock generating means each comprises the frequency divider means, the phase synchronizing means, and the switch means.

According to another species of the genus of the invention, the modulator means comprises a signal generating means operative in synchronism with the second operation clock for generating a combination of an I channel signal and a Q channel signal in accordance with the digital transmission data, the first clock generating means comprises a third clock generating means for generating a detection clock for the detector means, and a fourth clock generating means for generating the first operation clock, the fourth clock generating means comprising the frequency divider means, the phase synchronizing means, and the switch means, and the second clock generating means comprises the fourth clock generating means.

According to another species of the genus of the invention, the digital modulator-demodulator further comprises a reference clock generating means for generating the reference clock, and an integrated circuit formed on a single chip, the integrated circuit including the detector means, the modulator means, and the first and second clock generating means.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

Figure 1:
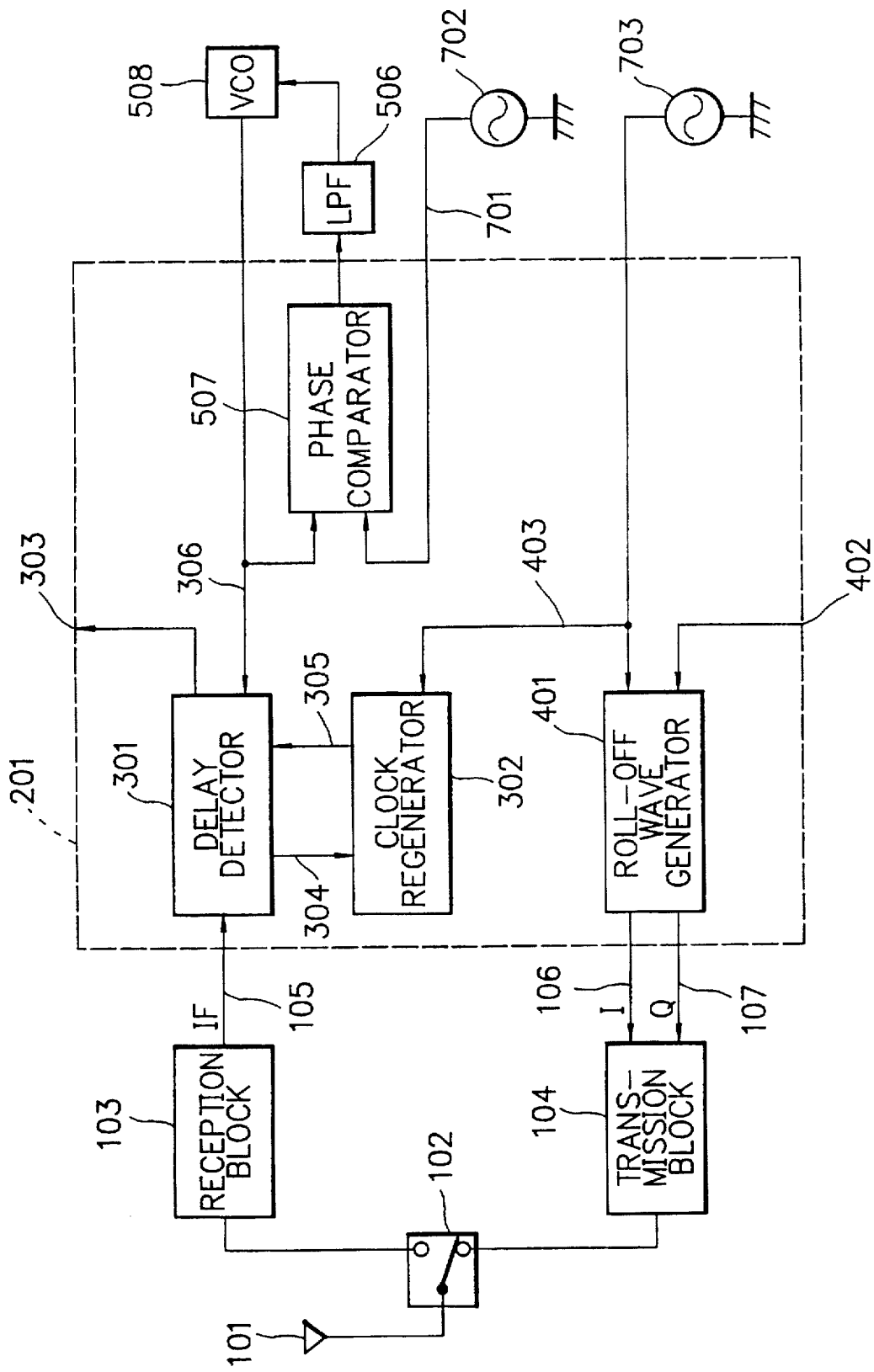
FIG. 1 is a block diagram of an essential part of a conventional digital portable telephone including a digital modem.

There will be detailed below the preferred embodiments of the present invention, with reference to the accompanying drawings. Like members are designated by like reference characters.

Figure 2:
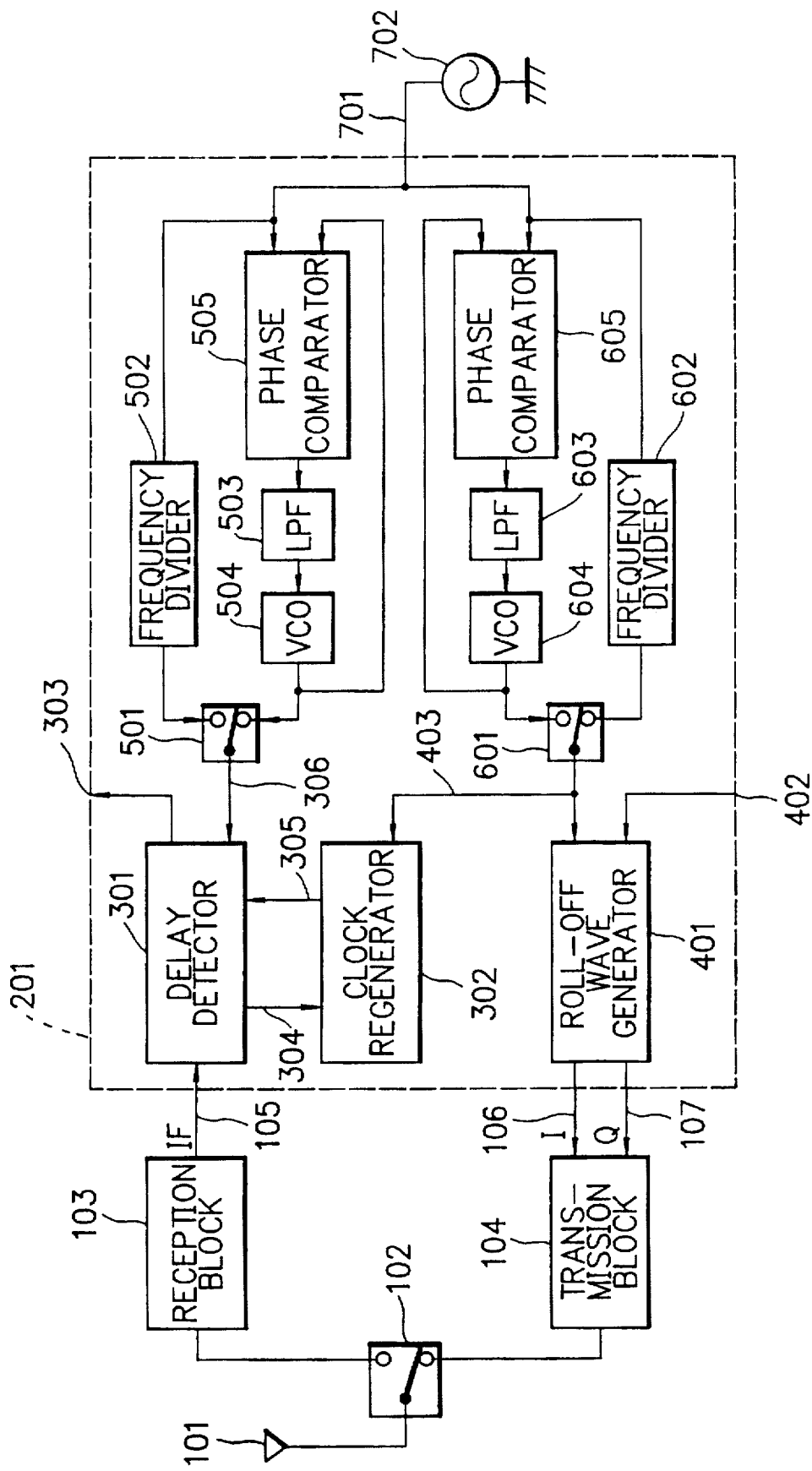
FIG. 2 is a block diagram of an essential part of a digital portable telephone including a digital modem according to an embodiment of the invention.

FIG. 2 is a block diagram of an essential part of a digital portable telephone including a digital modem according to an embodiment of the invention.

For adaptation to a generation of a detection clock 306 with a desired accuracy, the portable telephone of FIG. 2 includes a combination of a first PLL circuit 505-503-504 composed of a phase comparator 505, an LPF 503 and a VCO 504, a frequency divider 502, and a select switch 501 for alternatively selecting an output of one of the first PLL circuit and the frequency divider 502.

The frequency divider 502 is preset as necessary for frequency-dividing an oscillatory reference output 701 of a temperature-compensated quartz oscillator 702 as an external device to a modem LSI 201. The first PLL circuit is implemented for phase-synchronizing an output of the VCO 504 to the oscillatory reference output 701 of the oscillator 702.

Likewise, for adaptation to a generation of an operation clock 403 with a desired accuracy, the portable telephone of FIG. 2 further includes a combination of a second PLL circuit 605-603-604 composed of a phase comparator 605, an LPF 603 and a VCO 604, a frequency divider 602, and a select switch 601 for alternatively selecting an output of one of the second PLL circuit and the frequency divider 602.

The frequency divider 602 is preset as necessary for frequency-dividing the oscillatory reference output 701 of the oscillator 702. The second PLL circuit is implemented for phase-synchronizing an output of the VCO 604 to the same oscillatory reference output 701.

In the portable telephone of FIG. 2, it therefor is permitted for the modem LSI 201 to obtain both the detection clock 306 and the operation clock 403 from a single external oscillator, i.e. the oscillator 702, in addition to that the first and second PLL circuits have their LPFs built in the LSI 201 with effective reductions in application area and cost.

Moreover, the modem LSI 201 has built therein the frequency divider 502 for frequency-dividing the output 701 of the temperature-compensated quartz oscillator 702 and the select switch 501 for an alternative selection between the frequency divider 502 and the VCO 504, permitting a selective generation of the detection clock 306, as necessary, in dependence on a relationship between a frequency of the external quartz oscillator 702 and a desirable detection clock frequency for a design of a digital delay detector 301.

Further, the modem LSI 201 has built therein the frequency divider 602 for frequency-dividing the output 701 of the temperature-compensated quartz oscillator 702 and the select switch 601 for an alternative selection between the frequency divider 602 and the VCO 604, permitting a selective generation of the operation clock 403, as necessary, in dependence on a relationship between the frequency of the external quartz oscillator 702 and a desirable operation clock frequency for a design of a roll-off wave generator 401 as well as of a clock regenerator 302.

In an exemplary application of the modem LSI 201 to a typical digital portable telephone in Japan, there may be assigned a 14.4 MHz to the detection clock 306, a 12.8 MHz to the oscillatory reference output 701 of the temperature-compensated quartz oscillator 702 as a reference clock of the telephone, and a 2.688 MHz to the operation clock 403, whereas the 14.4 MHz detection clock 306 is generated at the built-in oscillator VCO 504 and selected by the select switch 501, and the 2.688 MHz operation clock 403 is generated at the built-in oscillator VC0 604 and selected by the select switch 601.

A quartz oscillator may be fabricated in a facilitated manner, if it is designed for a frequency between 10 MHz and 20 MHz.

In a modification to the temperature-compensated quartz oscillator 702, as it is designed for a 13.44 MHz equivalent to the 2.688 MHz times 5, the select switch 601 will be operated for selecting in place of the output of the VCO 604 an output of the frequency divider 602, as it is set to a frequency-divisor of 5, to obtain the operation clock 403.

In a modification to the temperature-compensated quartz oscillator 702, as it is designed for a 14.4 MHz, the select switch 501 will be operated for selecting in place of the output of the VCO 504 an output of the frequency divider 502 to obtain the detection clock 306.

In a modification in which the roll-off wave generator 401 and the clock regenerator 302 are operative in synchronism with the operation clock 403, as it is designed for a 3.15 MHz equivalent to a symbol period times 150, the reference clock 701 will be designed for a 12.6 MHz equivalent to the 3.15 MHz times 4 so that the select switch 601 may be operated for selecting an output of the frequency divider 602, as it is set to a frequency-divisor of 4, to obtain the operation clock 403.

The frequency dividers 502 and 602 may preferably be each modified to have a fixed frequency divisor or to be programmable for setting a frequency divisor, in consideration of associated clock frequencies, as they are determined in a system design.

Figure 3A:
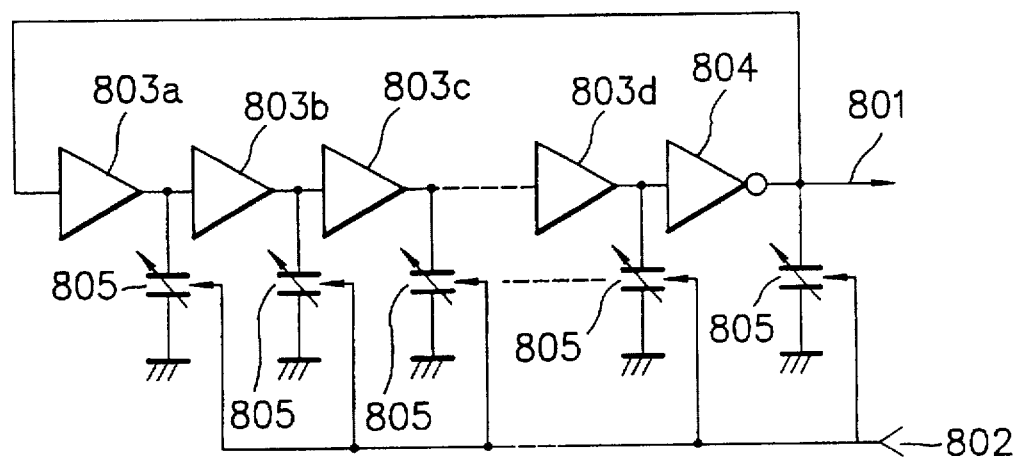
FIGS. 3A and 3B are circuit diagrams of VCOs in the modem of FIG. 2, respectively.
Figure 3B:
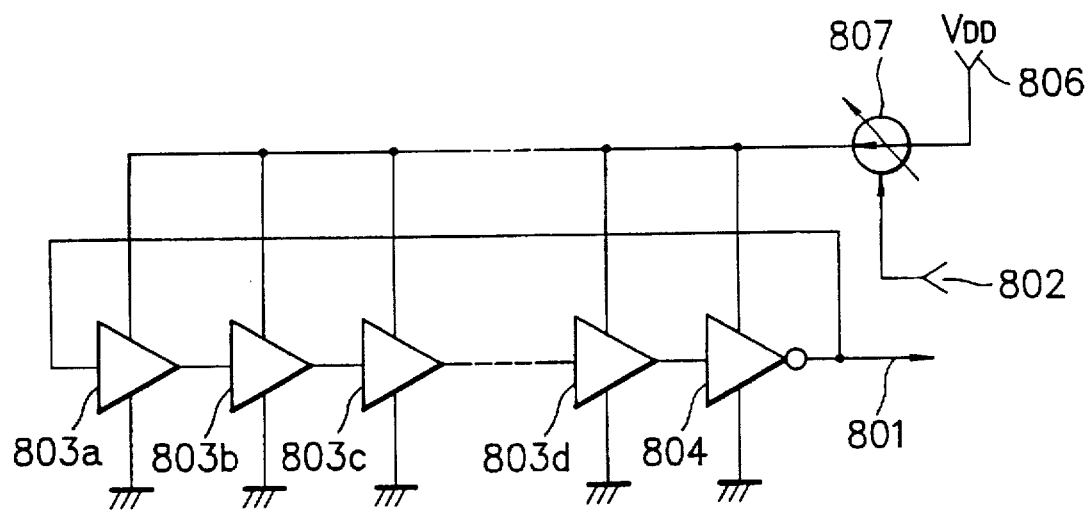

FIGS. 3A and 3B are exemplary circuit diagrams of the VCOs 504 and 604 built in the modem LSI 201.

In both examples, each VCO comprises a ring oscillator consisting of a plurality of serially connected logical buffers 803a to 803d and a single stage of a logical inverter 804 connected at an input end thereof to an output end of a final one 803d of the buffers and at an output end thereof to an input end of a first one 803a of the buffers so that an output of the final stage 804 is looped back as an input to the first stage 803a.

The input to the first stage 803a is transmitted through the buffers 803a to 803d, where it is sequentially delayed to provide a delayed signal which is input to the inverter 804 as the final stage, where it is logically inverted, thus generating an oscillatory signal.

The oscillatory signal has an oscillation frequency depending on the number of buffer and inverter stages and a delay time of each buffer. Accordingly, the frequency is voltage-controlled by way of controlling a transmission delay time.

In FIG. 3A, the ring oscillator includes a plurality of capacitors 805 as variable capacitive diodes of which a respective one is connected between an output terminal of a corresponding buffer and inverter stages and a ground potential and controlled with a variable voltage 802 for varying a capacitance thereof so that an output load is varied to thereby control the oscillation frequency.

In the ring oscillator of FIG. 3B, a current controller 807 is controlled with a variable voltage 802 so that a current from a power supply terminal 806 of a voltage $V_{DD}$ is controlled to be applied to each stage of the buffers 803a to 803d and the inverter 804, causing a driving capacity of the stage to be varied, thereby controlling the oscillation frequency, while the inverter 804 may be multiplicated in series providing that a total number thereof is an odd.

Incidentally, in the embodiment of FIG. 2, the operation clock 403 from a common clock generation circuit is employed by both the roll-off wave generator 401 and the clock regenerator 302. However, the operation clock 403 for the roll-off wave generator 401 as well as that for the clock regenerator 302 may be generated by a dedicated combination of a PLL circuit composed of a phase comparator, an LPF and a VCO built in a single modem LSI, and a build-in frequency divider.

Figure 4:
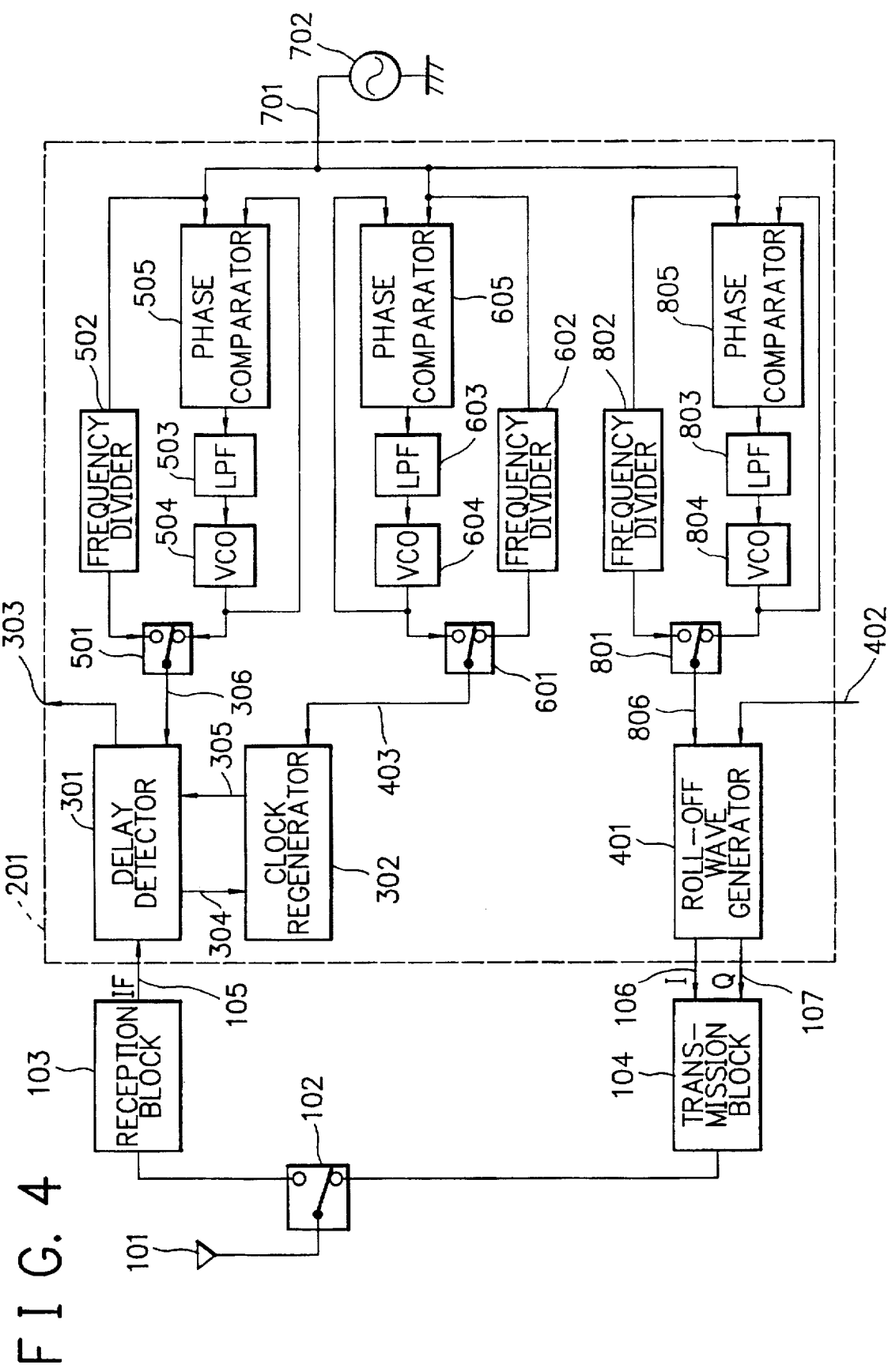
FIG. 4 is a block diagram of an essential part of a digital portable telephone including a digital modem according to another embodiment of the invention.

FIG. 4 is a block diagram of an essential part of a digital portable telephone including a digital modem according to another embodiment of the invention in which necessary clocks are generated by dedicated clock generation circuits, respectively.

Namely, for a generation of an operation clock 403 employed by a clock regenerator 302 at a demodulation side, the portable telephone of FIG. 4 includes a dedicated combination of a second PLL circuit 605-603-604 composed of a phase comparator 605, LPF 603 and a VCO 604, a frequency divider 602, and a select switch 601.

Moreover, for a generation of an operation clock 806 employed by a roll-off wave generator 401 at a modulation side, the portable telephone of FIG. 4 includes a dedicated combination of a third PLL circuit 805-803-804 composed of a phase comparator 805, LPF 803 and a VCO 804, a frequency divider 802, and a select switch 801.

In the embodiment of FIG. 4, an oscillatory reference output 701 of an external temperature-compensated quartz oscillator 702 is input as a reference clock to the third PLL circuit and the frequency divider 802.

In other words, for generating each operation or detection clock, as necessary, there is provided a dedicated combination of a frequency divider for frequency-dividing a single reference clock, a PLL circuit operative in phase-synchronism with the reference clock, and a select switch for alternatively selecting an output of one of the frequency divider and the PLL circuit to provide the necessary clock.

LPFs 503, 603 and 803 may be each provided as an external filter of which a time constant is controlled with a varible CR for an improved accuracy.

As will be understood from the foregoing description, according to the invention, a frequency divider for frequency-dividing a reference clock and a PLL circuit receiving the reference clock as a reference input thereto are either selected to use an output thereof as an operation or detection clock, so that a clock frequency is selective in accordance with a system constitution, with an increased selection range and an increased design flexibility, permitting a frequency change of the reference clock even after a design of a modem LSI.

Moreover, such the arrangement is employed to constitute a clock generating circuit for each of modulation and demodulation so that a single reference clock can be commonly used, permitting a modem to be formed as an LSI on a single chip with a single external reference clock oscillator, resulting in a reduced application area, a reduced cost, and a reduced number of input/output pins of the LSI.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital modulator-demodulator comprising:

a detector means operative in synchronism with a first operation clock for a digital detection of a received signal;

a modulator means operative in synchronism with a second operation clock for modulating a digital transmission data;

a first clock generating means for generating the first operation clock; and a second clock generating means for generating the second operation clock, wherein at least one of the first and second clock generating means comprises:

a frequency divider means for frequency-dividing a reference clock to provide a third clock;

a phase synchronizing means for generating a fourth clock phase-synchronised with the reference clock; and a switch means for alternatively selecting one of the third and fourth clocks to provide a corresponding one of the first and second operation clocks.

2. A digital modulator-demodulator according to claim 1, wherein each of the first and second clock generating means comprises the frequency divider means, the phase synchronizing means, and the switch means.

3. A digital modulator-demodulator according to claim 1, wherein the detector means comprises:

a detector operative for a delay detection of the received signal composed of a π/4-shift DQPSK signal; and a clock regenerator responsible for a result of the delay detection to detect a symbol period of the received signal, wherein the first clock generating means comprises:

a third clock generating means for generating a detection clock for the detector; and a fourth clock generating means for generating the first operation clock, and wherein the third and fourth clock generating means each comprises the frequency divider means, the phase synchronizing means, and the switch means.

4. A digital modulator-demodulator according to claim 1, wherein the modulator means comprises a signal generating means operative in synchronism with the second operation clock for generating a combination of an I channel signal and a Q channel signal in accordance with the digital transmission data, wherein the first clock generating means comprises:

a third clock generating means for generating a detection clock for the detector means; and a fourth clock generating means for generating the first operation clock, the fourth clock generating means comprising the frequency divider means, the phase synchronizing means, and the switch means.

5. A digital modulator-demodulator according to claim 1, further comprising:

a reference clock generating means for generating the reference clock; and an integrated circuit formed on a single chip, the integrated circuit including the detector means, the modulator means, and the first and second clock generating means.

* * * * *